(12) United States Patent
Ranjan et al.

(10) Patent No.: US 11,913,693 B2
(45) Date of Patent: *Feb. 27, 2024

(54) ENHANCED REFRIGERATION PURGE SYSTEM

(71) Applicant: Carrier Corporation, Palm Beach Gardens, FL (US)

(72) Inventors: Rajiv Ranjan, South Windsor, CT (US); Yinshan Feng, Manchester, CT (US); Parmesh Verma, South Windsor, CT (US); Michael A. Stark, Mooresville, NC (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 380 days.

This patent is subject to a terminal disclaimer.

(21) Appl. No.: 15/734,846

(22) PCT Filed: Nov. 27, 2019

(86) PCT No.: PCT/US2019/063512
§ 371 (c)(1),
(2) Date: Dec. 3, 2020

(87) PCT Pub. No.: WO2020/117582
PCT Pub. Date: Jun. 11, 2020

(65) Prior Publication Data
US 2021/0364203 A1 Nov. 25, 2021

Related U.S. Application Data

(60) Provisional application No. 62/774,725, filed on Dec. 3, 2018.

(51) Int. Cl.
F25B 43/04 (2006.01)
B01D 53/047 (2006.01)
F25B 49/02 (2006.01)

(52) U.S. Cl.
CPC .......... *F25B 43/043* (2013.01); *B01D 53/047* (2013.01); *F25B 49/02* (2013.01);
(Continued)

(58) Field of Classification Search
CPC ........... B01D 53/047; B01D 2257/104; F25B 2600/2505; F25B 2700/1931; F25B 2700/195; F25B 43/043; F25B 49/02
See application file for complete search history.

(56) References Cited

U.S. PATENT DOCUMENTS 2,044,166 A 6/1936 Hayden
4,304,102 A 12/1981 Gray
(Continued)

FOREIGN PATENT DOCUMENTS

CN 1791774 A 6/2006
CN 101254918 A 9/2008
(Continued)

OTHER PUBLICATIONS

International Search Report of the International Searching Authority; International Application No. PCT/US2019/063502; International Filing Date: Nov. 27, 2019; dated Mar. 30, 2020; 8 pages.
(Continued)

*Primary Examiner* — Henry T Crenshaw
(74) *Attorney, Agent, or Firm* — CANTOR COLBURN LLP

(57) ABSTRACT

A method of purging contaminants from a refrigerant of a heat pump via a purge system includes generating a driving force across a separator, providing refrigerant including contaminants to the separator, separating the contaminants from the refrigerant within the separator, monitoring one or more parameters of the purge system and the heat pump, and actively controlling an operational parameter of the purge
(Continued)

system in response to monitoring one or more parameters of the purge system and the heat pump.

15 Claims, 6 Drawing Sheets

(52) U.S. Cl.
CPC  *B01D 2257/104* (2013.01); *F25B 2600/2505* (2013.01); *F25B 2700/195* (2013.01); *F25B 2700/1931* (2013.01)

(56) References Cited

U.S. PATENT DOCUMENTS

| | | | |
|---|---|---|---|
| 4,316,364 A | 2/1982 | Spauschus | |
| 4,417,451 A | 11/1983 | Spauschus | |
| 4,842,621 A | 6/1989 | Robbims et al. | |
| 4,906,256 A | 3/1990 | Baker et al. | |
| 4,984,431 A | 1/1991 | Mount et al. | |
| 5,032,148 A | 7/1991 | Baker et al. | |
| 5,044,166 A | 9/1991 | Wijmans et al. | |
| 5,059,374 A | 10/1991 | Krueger et al. | |
| 5,062,273 A | 11/1991 | Lee et al. | |
| 5,071,451 A | 12/1991 | Wijmans | |
| 5,089,033 A | 2/1992 | Wijmans | |
| 5,156,657 A | 10/1992 | Jain et al. | |
| 5,355,685 A | 10/1994 | Stie et al. | |
| 5,429,662 A | 7/1995 | Fillet | |
| 5,517,825 A * | 5/1996 | Manz | F25B 43/043 62/85 |
| 5,598,714 A | 2/1997 | Strout et al. | |
| 5,611,841 A | 3/1997 | Baker et al. | |
| 5,636,526 A | 6/1997 | Plzak et al. | |
| 5,718,119 A | 2/1998 | Wakita et al. | |
| 5,806,322 A * | 9/1998 | Cakmakci | B01D 53/0454 62/85 |
| 5,842,349 A | 12/1998 | Wakita et al. | |
| 5,858,065 A | 1/1999 | Li et al. | |
| 5,901,780 A * | 5/1999 | Zeigler | F25B 17/083 62/480 |
| 6,128,916 A | 10/2000 | Callahan et al. | |
| 6,134,899 A | 10/2000 | Brown et al. | |
| 6,224,763 B1 | 5/2001 | Feng et al. | |
| 6,442,963 B1 | 9/2002 | Pfefferle et al. | |
| 6,457,326 B1 | 10/2002 | Serpente et al. | |
| 6,527,831 B2 | 3/2003 | Baksh et al. | |
| 6,705,100 B2 | 3/2004 | Heiden et al. | |
| 6,790,350 B2 | 9/2004 | Pex et al. | |
| 6,925,821 B2 | 8/2005 | Sienel | |
| 7,188,480 B2 | 3/2007 | Korin | |
| 7,282,148 B2 | 10/2007 | Dalton et al. | |
| 7,357,002 B2 | 4/2008 | Yoshimi et al. | |
| 7,387,661 B2 | 6/2008 | Qunwei et al. | |
| 7,690,219 B2 | 4/2010 | Suzuki et al. | |
| 7,713,333 B2 | 5/2010 | Rege et al. | |
| 7,758,670 B2 | 7/2010 | Wynn et al. | |
| 7,765,830 B2 | 8/2010 | Zhang | |
| 7,891,202 B1 | 2/2011 | Gallus | |
| 7,918,921 B2 | 4/2011 | Wynn | |
| 8,055,453 B2 | 11/2011 | Wyatt | |
| 8,182,592 B2 | 5/2012 | Nakamura et al. | |
| 8,216,473 B2 | 7/2012 | Wohlert | |
| 8,361,197 B2 | 1/2013 | Kawai et al. | |
| 8,394,171 B2 | 3/2013 | Elseviers et al. | |
| 8,580,015 B2 | 11/2013 | Taylor et al. | |
| 8,652,332 B2 | 2/2014 | Karnik et al. | |
| 9,067,169 B2 | 6/2015 | Patel | |
| 9,073,808 B1 | 7/2015 | Su et al. | |
| 9,175,233 B2 | 11/2015 | Goldstein et al. | |
| 9,199,191 B2 | 12/2015 | Fukuda et al. | |
| 9,216,373 B2 | 12/2015 | Girondi | |
| 9,504,962 B2 | 11/2016 | Yamaoka et al. | |
| 9,579,605 B1 | 2/2017 | Su et al. | |
| 9,610,534 B1 | 4/2017 | Thompson | |
| 9,718,023 B2 | 8/2017 | Kanetsuki et al. | |
| 9,987,568 B2 | 6/2018 | Stark et al. | |
| 9,989,285 B2 | 6/2018 | Fountain et al. | |
| 10,584,906 B2 | 3/2020 | Ranjan et al. | |
| 2002/0006369 A1 | 1/2002 | Buxbaum | |
| 2002/0148238 A1 | 10/2002 | Blume | |
| 2003/0075504 A1 | 4/2003 | Zha et al. | |
| 2003/0121840 A1 | 7/2003 | Pex et al. | |
| 2006/0011535 A1 | 1/2006 | Ikeda et al. | |
| 2006/0254422 A1 | 11/2006 | Spadaccini et al. | |
| 2007/0101759 A1 | 5/2007 | Matsuoka et al. | |
| 2007/0113581 A1 | 5/2007 | Yoshimi et al. | |
| 2007/0193285 A1 | 8/2007 | Knight et al. | |
| 2008/0202152 A1 | 8/2008 | Munoz et al. | |
| 2008/0202153 A1 | 8/2008 | Watanabe | |
| 2008/0217247 A1 | 9/2008 | Niino et al. | |
| 2010/0006503 A1 | 1/2010 | Bratton et al. | |
| 2011/0120157 A1 | 5/2011 | Wohlert | |
| 2012/0000220 A1 | 1/2012 | Altay | |
| 2013/0118198 A1 | 5/2013 | Brown et al. | |
| 2013/0283830 A1 | 10/2013 | Jandal et al. | |
| 2013/0283832 A1 | 10/2013 | Kujak et al. | |
| 2015/0053083 A1 | 2/2015 | Taylor | |
| 2015/0323226 A1 | 11/2015 | Haraki et al. | |
| 2016/0025393 A1 | 1/2016 | Rockwell | |
| 2016/0175740 A1 * | 6/2016 | Stark | B01D 19/0031 96/6 |
| 2017/0014748 A1 | 1/2017 | Li et al. | |
| 2017/0122670 A1 | 5/2017 | Ahlbom | |
| 2017/0307269 A1 | 10/2017 | Gu et al. | |
| 2017/0348643 A1 | 12/2017 | Noguchi et al. | |
| 2018/0066880 A1 | 3/2018 | Ranjan | |
| 2018/0243685 A1 | 8/2018 | Henson et al. | |
| 2020/0149791 A1 | 5/2020 | Ranjan et al. | |
| 2021/0229024 A1 | 7/2021 | Ranjan et al. | |
| 2021/0231354 A1 | 7/2021 | Ranjan et al. | |
| 2021/0364202 A1 | 11/2021 | Ranjan et al. | |

FOREIGN PATENT DOCUMENTS

| | | |
|---|---|---|
| CN | 101373111 A | 2/2009 |
| CN | 201363956 Y | 12/2009 |
| CN | 101910756 A | 12/2010 |
| CN | 201954828 U | 8/2011 |
| CN | 101852524 B | 7/2012 |
| CN | 203657302 U | 6/2014 |
| CN | 104785045 A | 7/2015 |
| CN | 106895617 A | 6/2017 |
| CN | 107763910 A | 3/2018 |
| CN | 108061410 A | 5/2018 |
| CN | 108344214 A | 7/2018 |
| CN | 108413665 A | 8/2018 |
| CN | 108474601 A | 8/2018 |
| DE | 19908848 A1 | 7/2000 |
| EP | 0284850 B1 | 10/1988 |
| EP | 0875281 A1 | 11/1998 |
| EP | 0943367 A1 | 9/1999 |
| EP | 1650509 A1 | 4/2006 |
| EP | 1681523 A1 | 7/2006 |
| EP | 2312241 A1 | 4/2011 |
| EP | 2815798 A1 | 12/2014 |
| EP | 3085430 A1 | 10/2016 |
| EP | 3118545 A1 | 1/2017 |
| GB | 1112580 A | 5/1968 |
| GB | 2011796 A | 7/1979 |
| GB | 2276229 A | 9/1994 |
| JP | H0552452 A | 3/1993 |
| JP | H0557125 A | 3/1993 |
| JP | H07294065 A | 11/1995 |
| JP | H10213363 A | 8/1998 |
| JP | 2005127561 A | 5/2005 |
| JP | 2005127563 A | 5/2005 |
| JP | 2005127564 A | 5/2005 |
| JP | 2005127565 A | 5/2005 |
| JP | 4265369 B2 | 5/2009 |
| JP | 2010159952 A | 7/2010 |
| JP | 11248298 | 9/2011 |
| JP | 2013039546 A | 2/2013 |
| JP | 5585307 | 9/2014 |

(56) References Cited

FOREIGN PATENT DOCUMENTS

| JP | 2015182070 A | 10/2015 |
|---|---|---|
| KR | 101533348 B1 | 7/2015 |
| WO | 9717125 A1 | 5/1997 |
| WO | 2015020719 A1 | 2/2015 |
| WO | 2015091303 A1 | 6/2015 |
| WO | 2017184663 A1 | 10/2017 |
| WO | 2018134789 A1 | 7/2018 |

OTHER PUBLICATIONS

International Search Report of the International Searching Authority; International Application No. PCT/US2019/063512; International Filing Date: Nov. 27, 2019; dated Feb. 18, 2020; 5 pages.
International Search Report of the International Searching Authority; International Application No. PCT/US2019/063657; International Filing Date: Nov. 27, 2019; dated Feb. 18, 2020; 5 pages.
International Search Report of the International Searching Authority; International Application No. PCT/US2019/064174; International Filing Date: Dec. 3, 2019; dated Feb. 18, 2020; 6 pages.
Written Opinion of the International Searching Authority; International Application No. PCT/US2019/063502; International Filing Date: Nov. 27, 2019; dated Mar. 30, 2020; 10 pages.
Written Opinion of the International Searching Authority; International Application No. PCT/US2019/063512; International Filing Date: Nov. 27, 2019; dated Feb. 18, 2020; 7 pages.
Written Opinion of the International Searching Authority; International Application No. PCT/US2019/063657; International Filing Date: Nov. 27, 2019; dated Feb. 18, 2020; 7 pages.
Written Opinion of the International Searching Authority; International Application No. PCT/US2019/064174; International Filing Date: Dec. 3, 2019; dated Dec. 3, 2018; 7 pages.
Chinese First Office Action; Chinese Application No. 201980041006.4; dated Jul. 15, 2022; 14 pages.
Chinese First Office Action; Chinese Application No. 201980041011.5; dated Aug. 5, 2022; 17 pages.
U.S. Final Office Action; U.S. Appl. No. 15/734,844; dated Aug. 8, 2022; 14 pages.
International Preliminary Report on Patentability; International Application No. PCT/US2019/063502; International Filing Date: Nov. 27, 2019; dated Jun. 17, 2021; 10 pages.
International Preliminary Report on Patentability; International Application No. PCT/US2019/063512; International Filing Date: Nov. 27, 2019; dated Jun. 17, 2021; 7 pages.
International Preliminary Report on Patentability; International Application No. PCT/US2019/063657; International Filing Date: Nov. 27, 2019; dated Jun. 17, 2021; 7 pages.
International Preliminary Report on Patentability; International Application No. PCT/US2019/064174; International Filing Date: Dec. 3, 2019; dated Jun. 17, 2021; 7 pages.
"Cascade Reverse Osmosis and the Absorption Osmosis Cycle"; Battelle Memorial Institute; ARPA-E; Retrieved Online from http://arpa-e.energy.gov/?q=slick-sheet-project/cascade-reverse-osmosis-air-conditioning-system on Jul. 12, 2010; 1 Page.
"Non-Condensable Gas Purge Equipment for Use with Low Pressure Centrifugal Liquid Chillers"; AHRI Laboratory; Air-Conditioning Heating, & Refrigeration Institute; Oct. 26, 2018; 2 Pages.
Biruh Shimekit and Hilmi Mihtar (2012). Natural Gas Purification Technologies—Major Advances for CO2 Separation and Future Directions, Advances in Natural Gas Technology, Dr. Hamid Al-megren (Ed.)ISBN:978-953-51-0507-7, pp. 235-270, http://cdn.intechopen.com/pdfs/35293/InTech-Natural_gas_purification_technologies_major_advances_for_co2_separation_and_future_directions.pdf.
Chinese Office Action and Search Report from Chinese Application No. 201480044756.4 dated Apr. 28, 2017; 17 Pages.
Chinese Office Action and Search Report from Chinese Application No. 201480044756.4 dated Dec. 14, 2017; 18 Pages.
Coronas et al.; "Separations Using Zeolite Membranes"; Separation and Purification Methods; vol. 28, Issue 2; 1999; 6 Pages.
Daramola et al.; "Potential Applications of Zeolite Membranes in Reaction Coupling Separation Processes"; Materials; vol. 5; 2012; pp. 2101-2136.
Extended European Search Report; International Application No. 18205247.2-1008; International Filing Date: Nov. 8, 2018; dated Mar. 14, 2019; 7 pages.
International Search Report of the International Searching Authority; International Application No. PCT/US2014/040795; International filing date: Jun. 4, 2014; dated Aug. 29, 2014, 4 pages.
Rao et al.; "Nanoporous Carbon Membranes for Separation of Gas Mixtures by Selective Surface Flow"; Journal of Membrane Science; vol. 85, Issue 3; Dec. 2, 1993; pp. 253-264.
U.S. Non-Final Office Action; U.S. Appl. No. 14/909,542; Application Filing Date: Feb. 2, 2016; dated Sep. 21, 2017; 23 pages.
U.S. Non-Final Office Action; U.S. Appl. No. 15/808,837; Application Filing Date: Nov. 9, 2017; dated Jun. 6, 2019; 32 pages.
Written Opinion of the International Searching Authority; International Application No. PCT/US2014/040795; International Filing Date: Jun. 4, 2014; dated Aug. 29, 2014; 4 pages.
U.S. Non-Final Office Action; U.S. Appl. No. 15/734,844; Filing Date: Dec. 3, 2020; dated Jan. 27, 2022; 34 pages.
Chinese Office Action for Chinese Application No. 201980041006.4; dated Feb. 11, 2023; with Machine Translation (pp. 1-6).
Chinese Office Action for Chinese Application No. 201980041011.5; dated Feb. 24, 2023; with Machine Translation (pp. 1-12).
U.S. Non-Final Office Action; U.S. Appl. No. 15/734,842; Filing Date: Dec. 3, 2020; dated Apr. 14, 2023; 36 pages.
Chinese Office Action for Chinese Application No. 201980041015.3; dated Dec. 28, 2022 (pp. 1-8).
U.S. Non-Final Office Action; U.S. Appl. No. 15/734,392; dated Jul. 18, 2023; 11 pages.
Chinese Office Action for Chinese Application No. 201980041015.3; Report dated Sep. 28, 2023 (pp. 1-14—With machine translation).

* cited by examiner

ENHANCED REFRIGERATION PURGE SYSTEM

CROSS REFERENCE TO RELATED APPLICATIONS

This application is a National Stage Application of PCT/US2019/063512, filed Nov. 27, 2019, which claims priority to U.S. Provisional Application 62/774,725 filed Dec. 3, 2018, both which are incorporated by reference in their entirety herein.

BACKGROUND

Embodiments of the present disclosure relate generally to chiller systems used in air conditioning systems, and more particularly to a purge system for removing contaminants from a refrigeration system.

Chiller systems such as those utilizing centrifugal compressors may include sections that operate below atmospheric pressure. As a result, leaks in the chiller system may draw air into the system, contaminating the refrigerant. This contamination degrades the performance of the chiller system. To address this problem, existing low pressure chillers include a purge unit to remove contamination. Existing purge units typically use a vapor compression cycle to separate contaminant gas from the refrigerant. Existing purge units are complicated and lose refrigerant in the process of removing contamination.

BRIEF DESCRIPTION

According to an embodiment, a method of purging contaminants from a refrigerant of a heat pump via a purge system includes generating a driving force across a separator, providing refrigerant including contaminants to the separator, separating the contaminants from the refrigerant within the separator, monitoring one or more parameters of the purge system and the heat pump, and actively controlling an operational parameter of the purge system in response to monitoring one or more parameters of the purge system and the heat pump.

In addition to one or more of the features described above, or as an alternative, in further embodiments monitoring of one or more parameters of the purge system and the heat pump includes monitoring a high side pressure of the heat pump.

In addition to one or more of the features described above, or as an alternative, in further embodiments if the high side pressure of the heat pump is above a threshold, the heat pump is operable to generate a pressure differential across the separator.

In addition to one or more of the features described above, or as an alternative, in further embodiments actively controlling an operational parameter of the purge system in response to the high side pressure of the heat pump includes controlling operation of a prime mover coupled to the separator.

In addition to one or more of the features described above, or as an alternative, in further embodiments if the high side pressure of the heat pump is below a threshold, the prime mover generates a pressure differential across the separator.

In addition to one or more of the features described above, or as an alternative, in further embodiments monitoring one or more parameters of the purge system and the heat pump includes monitoring a difference in pressure across the separator.

In addition to one or more of the features described above, or as an alternative, in further embodiments if the difference in pressure across the separator is below a threshold, actively controlling an operational parameter of the purge system in response to monitoring the difference in pressure across the separator includes maintaining constant operation of the purge system.

In addition to one or more of the features described above, or as an alternative, in further embodiments if the difference in pressure across the separator is above a threshold, actively controlling an operational parameter of the purge system in response to monitoring the difference in pressure across the separator includes adjusting operation of a prime mover of the purge system or operation of a valve in the purge system.

In addition to one or more of the features described above, or as an alternative, in further embodiments operation of a valve in the separation system includes opening the valve to release contaminants from the separator.

In addition to one or more of the features described above, or as an alternative, in further embodiments monitoring one or more parameters of the purge system and the heat pump includes monitoring a rate of change of difference in pressure across the separator.

In addition to one or more of the features described above, or as an alternative, in further embodiments if the rate of change of difference in pressure across the separator is below a threshold, actively controlling an operational parameter of the purge system in response to monitoring the rate of change of difference in pressure across the separator includes maintaining constant operation of the purge system.

In addition to one or more of the features described above, or as an alternative, in further embodiments if the rate of change of difference in pressure across the separator is above a threshold, actively controlling an operational parameter of the purge system in response to monitoring the rate of change of difference in pressure across the separator includes adjusting operation of a prime mover of the purge system or operation of a valve in the purge system.

In addition to one or more of the features described above, or as an alternative, in further embodiments monitoring one or more parameters of the purge system and the vapor compression loop includes monitoring an amount of contaminants within the refrigerant.

In addition to one or more of the features described above, or as an alternative, in further embodiments monitoring an amount of contaminants within the refrigerant occurs at a position within the purge system upstream from the separator with respect to a flow of refrigerant.

In addition to one or more of the features described above, or as an alternative, in further embodiments monitoring an amount of contaminants within the refrigerant includes monitoring an amount of oxygen within the refrigerant.

In addition to one or more of the features described above, or as an alternative, in further embodiments actively controlling an operational parameter of the purge system in response to monitoring the amount of oxygen within the refrigerant includes operating a prime mover of the purge system or operating a valve in the purge system only when oxygen is present within the refrigerant.

In addition to one or more of the features described above, or as an alternative, in further embodiments monitoring an amount of contaminants within the refrigerant includes monitoring a density of the mixture of refrigerant and contaminants.

In addition to one or more of the features described above, or as an alternative, in further embodiments monitoring one or more parameters of the purge system and the vapor compression loop includes measuring a flow of refrigerant or contaminant or a mixture thereof through the purge system.

In addition to one or more of the features described above, or as an alternative, in further embodiments measuring the flow of refrigerant or contaminant or a mixture thereof through the purge system occurs at a position downstream from the separator with respect to the flow of refrigerant.

In addition to one or more of the features described above, or as an alternative, in further embodiments the purge system further comprises a controller and a prime mover, and actively controlling an operational parameter of the purge system includes controlling operation of the prime mover via the controller.

In addition to one or more of the features described above, or as an alternative, in further embodiments the purge system further comprises a controller and at least one valve, and actively controlling an operational parameter of the purge system includes controlling a position of the at least one valve via the controller.

In addition to one or more of the features described above, or as an alternative, in further embodiments the heat pump further comprises a condenser and monitoring one or more parameters of the purge system and the vapor compression loop includes measuring a temperature at an outlet of the condenser.

In addition to one or more of the features described above, or as an alternative, in further embodiments if the temperature at an outlet of the condenser is below a threshold, actively controlling an operational parameter of the purge system in response to monitoring the difference in pressure across the separator includes maintaining constant operation of the purge system.

In addition to one or more of the features described above, or as an alternative, in further embodiments if the temperature at an outlet of the condenser is above a threshold, actively controlling an operational parameter of the purge system in response to monitoring the difference in pressure across the separator includes adjusting operation of a prime mover of the purge system or operation of a valve in the purge system.

In addition to one or more of the features described above, or as an alternative, in further embodiments the driving force includes a pressure differential.

In addition to one or more of the features described above, or as an alternative, in further embodiments the driving force includes heat.

According to another embodiment, a heat pump including a vapor compression loop and a purge system in communication with the vapor compression loop. The purge system includes a separator operable to separate contaminants from a refrigerant purge gas provided from the vapor compression loop. A sensor is operable to monitor one or more parameters of the purge system and the vapor compression loop. A controller is connected to the sensor and is operable to actively control at least one operational parameter of the purge system in response to data provided by the sensor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
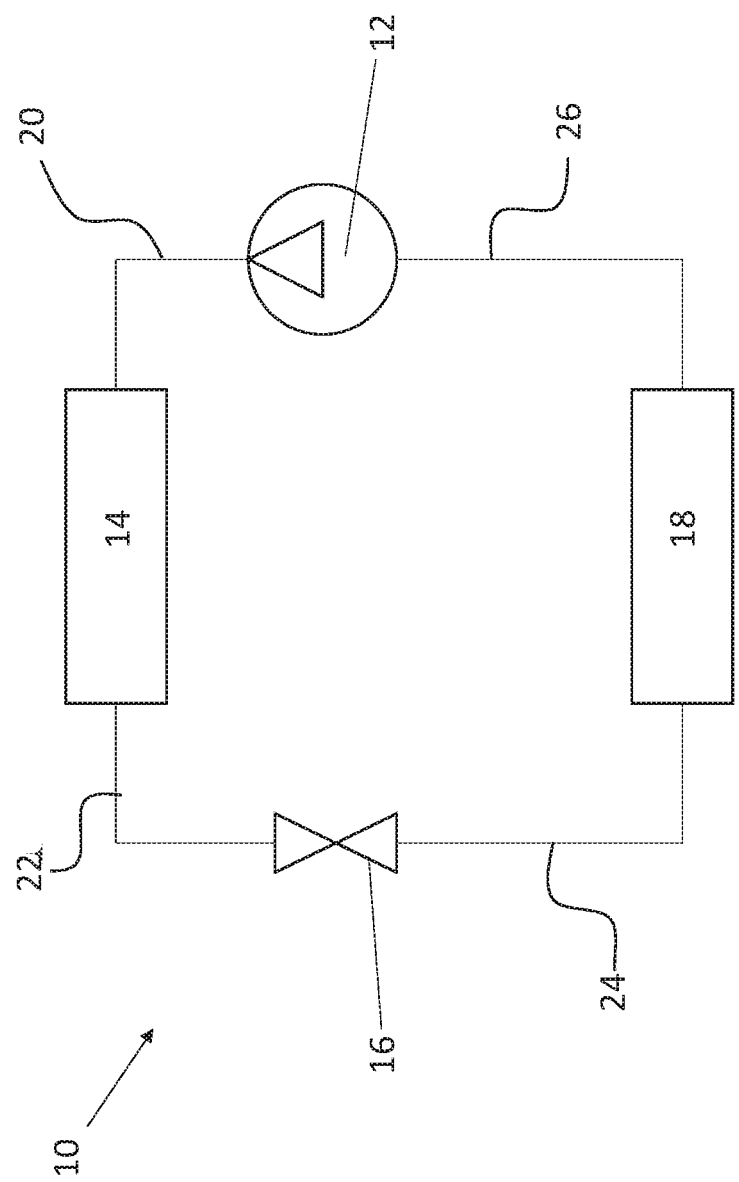
FIG. 1 is a schematic diagram of a vapor compression loop of a refrigerant system.

Referring now to FIG. 1, an example of a heat pump 10 is illustrated. As used herein, the term heat pump is intended to include any system capable of heating and/or cooling, such as a vapor compression system, a sorption system, a geothermal system, a waste heat recovery system, a heat based cooling system, and a heating system. As shown, heat pump 10 includes a compressor 12, a condenser 14, an expansion valve 16, and an evaporator 18. The compressor 12 pressurizes heat transfer fluid in its gaseous state, which both heats the fluid and provides pressure to circulate it through the system. In some embodiments, the heat transfer fluid, or refrigerant, includes an organic compound. For example, in some embodiments, the refrigerant comprises at least one of a hydrocarbon, substituted hydrocarbon, a halogen-substituted hydrocarbon, a fluoro-substituted hydrocarbon, or a chloro-fluoro-substituted hydrocarbon.

The hot pressurized gaseous heat transfer fluid exiting from the compressor 12 flows through a conduit 20 to a heat rejection heat exchanger such as condenser 14. The condenser is operable to transfer heat from the heat transfer fluid to the surrounding environment, resulting in condensation of the hot gaseous heat transfer fluid to a pressurized moderate temperature liquid. The liquid heat transfer fluid exiting from the condenser 14 flows through conduit 22 to expansion valve 16, where the pressure is reduced. The reduced pressure liquid heat transfer fluid exiting the expansion valve 16 flows through conduit 24 to a heat absorption heat exchanger such as evaporator 18. The evaporator 18 functions to absorb heat from the surrounding environment and boil the heat transfer fluid. Gaseous heat transfer fluid exiting the evaporator 18 flows through conduit 26 to the compressor 12, so that the cycle may be repeated.

The heat pump 10 has the effect of transferring heat from the environment surrounding the evaporator 18 to the environment surrounding the condenser 14. The thermodynamic properties of the heat transfer fluid must allow it to reach a high enough temperature when compressed so that it is greater than the environment surrounding the condenser 14, allowing heat to be transferred to the surrounding environment. The thermodynamic properties of the heat transfer fluid must also have a boiling point at its post-expansion pressure that allows the temperature surrounding the evaporator 18 to provide heat to vaporize the liquid heat transfer fluid.

Various types of refrigeration systems may be classified as a heat pump 10 as illustrated and described herein. One such refrigeration system is a chiller system. Portions of a refrigeration system, such as the cooler of a chiller system for example, may operate at a low pressure (e.g., less than atmosphere) which can cause contamination (e.g., ambient air or water or other environmental gasses) to be drawn into the fluid loop of the heat pump 10. The contamination degrades performance of the refrigeration system. To improve operation, the heat pump 10 of a refrigeration system may additionally include a purge system 30 for removing contamination from the heat transfer fluid of the heat pump 10.

Figure 2:
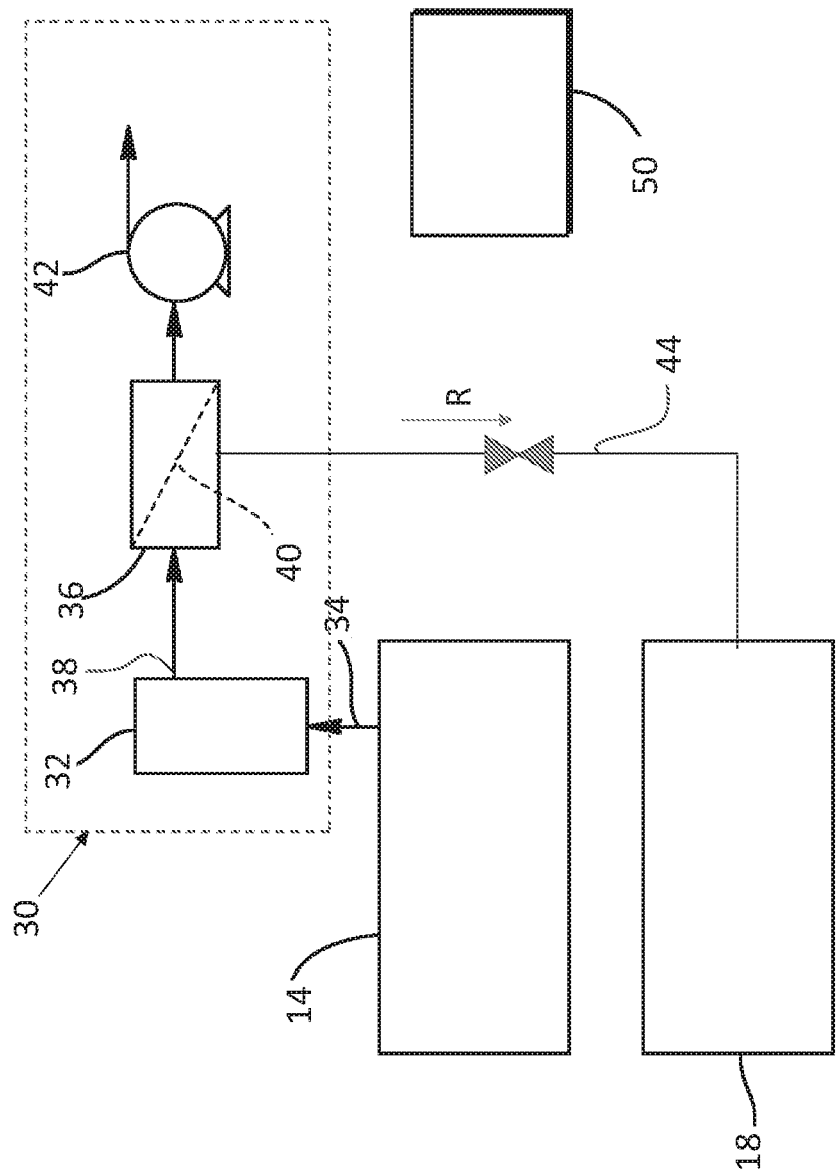
FIG. 2 is a schematic diagram of a purge system according to an embodiment.
Figure 3:
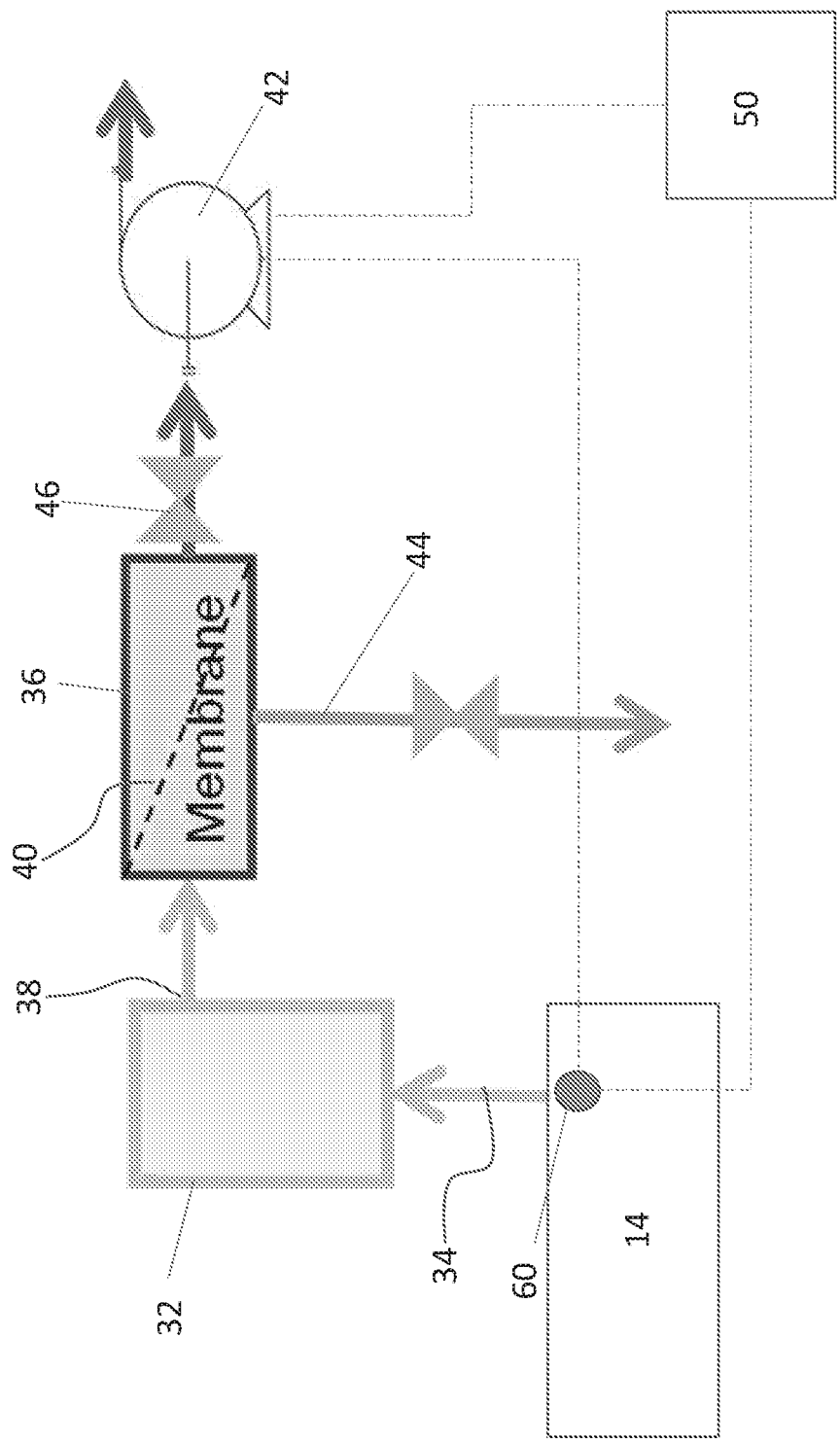
FIG. 3 is a schematic diagram of a purge system according to an embodiment.

With reference now to FIG. 2, an example of a purge system 30 is illustrated in more detail. As shown, the purge system 30 includes a purge collector 32 connected to the condenser 14 of heat pump 10 via a purge connection 34. The purge collector 32 receives purge gas including refrigerant gas and contaminants, such as nitrogen and oxygen for example, from the purge connection 34. The purge system 30 additionally includes at least one separator 36 arranged downstream from and in fluid communication with an outlet 38 of the purge collector 32. In the illustrated, non-limiting embodiment, the separator 36 includes a separating material 40 for separating contaminants from the refrigerant gas. In other embodiments, the separator 36 may include a vessel or housing containing one or more beds of sorbent material operable to separate a non-condensable gas from the purge gas through pressure swing sorption (PSA). Although a single separator 36 is illustrated, it should be understood that embodiments including a plurality of separators 36, arranged in series or parallel, are also contemplated herein.

In embodiments where the separating material 40 includes a membrane, the membrane may include a porous inorganic material. Examples of porous inorganic material can include ceramics such as metal oxides or metal silicates, more specifically aluminosilicates, (e.g., Chabazite Framework (CHA) zeolite, Linde type A (LTA) zeolite), porous carbon, porous glass, clays (e.g., Montmorillonite, Halloysite). Porous inorganic materials can also include porous metals such as platinum and nickel. Hybrid inorganic-organic materials such as a metal organic framework (MOF) can also be used. Other materials can be present in the membrane such as a carrier in which a microporous material can be dispersed, which can be included for structural or process considerations.

Metal organic framework materials are well-known in the art, and comprise metal ions or clusters of metal ions coordinated to organic ligands to form one-, two- or three-dimensional structures. A metal-organic framework can be characterized as a coordination network with organic ligands containing voids. The coordination network can be characterized as a coordination compound extending, through repeating coordination entities, in one dimension, but with cross-links between two or more individual chains, loops, or spiro-links, or a coordination compound extending through repeating coordination entities in two or three dimensions. Coordination compounds can include coordination polymers with repeating coordination entities extending in one, two, or three dimensions. Examples of organic ligands include but are not limited to bidentate carboxylates (e.g., oxalic acid, succinic acid, phthalic acid isomers, etc.), tridentate carboxylates (e.g., citric acid, trimesic acid), azoles (e.g., 1,2,3-triazole), as well as other known organic ligands. A wide variety of metals can be included in a metal organic framework. Examples of specific metal organic framework materials include but are not limited to zeolitic imidazole framework (ZIF). HKUST-1.

In embodiments where the separating material 40 includes a sorbent material, the sorbent material may be a porous inorganic material. Examples of suitable sorbent materials include, but are not limited to, zeolites, activated carbon, ionic liquids, metal organic framework, oils, clay materials, and molecular sieves for example. When the bed of sorbent material is pressurized to a high, adsorption pressure, the more readily adsorbable component of the purge gas provided to the inlet end 42 of the separator 36 is selectively adsorbed by the sorbent material and forms an adsorption front that passes from the inlet end toward the outlet end. The less readily adsorbable component of the purge gas passes through the bed of sorbent material 40 and is recovered from the outlet end thereof for further processing or use downstream. In the illustrated, non-limiting embodiment, the contaminant within the purge gas, such as oxygen for example, is the more readily adsorbable component, and the refrigerant is the less adsorbable component within the purge gas. Accordingly, if the purge gas is passed through a separator 36 containing a bed of sorbent material that attracts oxygen, part or all of the oxygen in the purge gas will stay within the bed of sorbent material. Consequently, the purge gas discharged from the outlet end of the separator 36 will be richer in refrigerant than the purge gas entering the separator 36.

When the bed of sorbent material reaches the end of its capacity to adsorb oxygen, the bed of sorbent material can be regenerated by changing the pressure acting thereon. By reducing the pressure, the adsorbed oxygen will be released from the bed of sorbent material, and may be exhausted from the separator 36, such as to the ambient atmosphere, external to the refrigeration circuit. However, it should be understood that in other embodiments, the bed of sorbent material may be regenerated via application of either a positive or negative pressure.

In some embodiments, pore sizes of the separating material 40 can be characterized by a pore size distribution with an average pore size from 2.5 Å to 10.0 Å, and a pore size distribution of at least 0.1 Å. In some embodiments, the average pore size for the porous material can be in a range with a lower end of 2.5 Å to 4.0 Å and an upper end of 2.6 Å to 10.0 Å. A. In some embodiments, the average pore size can be in a range having a lower end of 2.5 Å, 3.0 Å, 3.5 Å, and an upper end of 3.5 Å, 5.0 Å, or 6.0 Å. These range endpoints can be independently combined to form a number of different ranges, and all ranges for each possible combination of range endpoints are hereby disclosed. Porosity of the material can be in a range having a lower end of 5%, 10%, or 15%, and an upper end of 85%, 90%, or 95% (percentages by volume). These range endpoints can be independently combined to form a number of different ranges, and all ranges for each possible combination of range endpoints are hereby disclosed.

The above microporous materials can be can be synthesized by hydrothermal or solvothermal techniques (e.g., sol-gel) where crystals are slowly grown from a solution. Templating for the microstructure can be provided by a secondary building unit (SBU) and the organic ligands. Alternate synthesis techniques are also available, such as physical vapor deposition or chemical vapor deposition, in which metal oxide precursor layers are deposited, either as a primary microporous material, or as a precursor to an MOF structure formed by exposure of the precursor layers to sublimed ligand molecules to impart a phase transformation to an MOF crystal lattice.

In some embodiments, the above-described membrane materials can provide a technical effect of promoting separation of contaminants (e.g., nitrogen, oxygen and/or water molecules) from refrigerant gas, which is condensable. Other air-permeable materials, such as porous or non-porous polymers can be subject to solvent interaction with the matrix material, which can interfere with effective separation. In some embodiments, the capabilities of the materials described herein can provide a technical effect of promoting the implementation of a various example embodiments of refrigeration systems with purge, as described in more detail with reference to the example embodiments below.

The separating material 40 can be self-supporting or it can be supported, for example, as a layer on a porous support or integrated with a matrix support material. In some embodiments, thickness of a support for a supported membrane can range from 50 nm to 1000 nm, more specifically from 100 nm to 750 nm, and even more specifically from 250 nm to 500 nm. In the case of tubular membranes, fiber diameters can range from 100 nm to 2000 nm, and fiber lengths can range from 0.2 m to 2 m.

In some embodiments, the microporous material can be deposited on a support as particles in a powder or dispersed in a liquid carrier using various techniques such as spray coating, dip coating, solution casting, etc. The dispersion can contain various additives, such as dispersing aids, rheology modifiers, etc. Polymeric additives can be used; however, a polymer binder is not needed, although a polymer binder can be included and in some embodiments is included such as with a mixed matrix membrane comprising a microporous inorganic material (e.g., microporous ceramic particles) in an organic (e.g., organic polymer) matrix. However, a polymer binder present in an amount sufficient to form a contiguous polymer phase can provide passageways in the membrane for larger molecules to bypass the molecular sieve particles. Accordingly, in some embodiments a polymer binder is excluded. In other embodiments, a polymer binder can be present in an amount below that needed to form a contiguous polymer phase, such as embodiments in which the membrane is in series with other membranes that may be more restrictive. In some embodiments, particles of the microporous material (e.g., particles with sizes of 0.01 μm to 10 mm, or in some embodiments from 0.5 μm to 10 μm) can be applied as a powder or dispersed in a liquid carrier (e.g., an organic solvent or aqueous liquid carrier) and coated onto the support followed by removal of the liquid. In some embodiments, the application of solid particles of microporous material from a liquid composition to the support surface can be assisted by application of a driving force across the support. For example a vacuum can be applied from the opposite side of the support as the liquid composition comprising the solid microporous particles to assist in application of the solid particles to the surface of the support. A coated layer of microporous material can be dried to remove residual solvent and optionally heated to fuse the microporous particles together into a contiguous layer. Various membrane structure configurations can be utilized, including but not limited to flat or planar configurations, tubular configurations, or spiral configurations. In some embodiments, the membrane can include a protective polymer coating or can utilize or can utilize backflow or heating to regenerate the membrane.

In some embodiments, the microporous material can be configured as nanoplatelets, such as zeolite nanosheets for example. Zeolite nanosheet particles can have thicknesses ranging from 2 to 50 nm, more specifically 2 to 20 nm, and even more specifically from 2 nm to 10 nm. Zeolite such as zeolite nanosheets can be formed from any of various zeolite structures, including but not limited to framework type MFI, MWW, FER, LTA, FAU, and mixtures of the preceding with each other or with other zeolite structures. In a more specific group of exemplary embodiments, the zeolite such as zeolite nanosheets can comprise zeolite structures selected from MFI, MWW, FER, LTA framework type. Zeolite nanosheets can be prepared using known techniques such as exfoliation of zeolite crystal structure precursors. For example, MFI and MWW zeolite nanosheets can be prepared by sonicating the layered precursors (multilamellar silicalite-1 and ITQ-1, respectively) in solvent. Prior to sonication, the zeolite layers can optionally be swollen, for example with a combination of base and surfactant, and/or melt-blending with polystyrene. The zeolite layered precursors are typically prepared using conventional techniques for preparation of microporous materials such as sol-gel methods.

With continued reference to FIG. 2, at least one prime mover 42 may be selectively coupled to the separator 36 to provide a driving force to pass contaminant gas molecules through the separating material 40, such that the contaminant molecules collect therein, or exit from a second side of the separating material 40 and through an outlet of the purge system 30. The at least one prime mover 42 may include a pump, and the driving force generated by the pump may be a positive or negative pressure. Alternatively, or in addition, the driving force generated by the at least one prime mover 42 is heat. In an embodiment, the prime mover 42 can be positioned within the fluid loop. For example, a refrigerant pump or compressor may be used as the prime mover. Refrigerant gas tends to remain on the first side of the separating material 40 and may be returned to the vapor compression loop 10, such as to the evaporator 18 for example, through a connection or conduit illustrated at 44.

A controller 50 is operably coupled to the prime mover 42 of the purge system 30. In an embodiment, the controller 50 receives system data (e.g., pressure, temperature, mass flow rates) and utilizes electronic control components, such as a microprocessor for example, to control one or more components of the purge system 30, such as various pumps, valves, and switches for example, in response to the system data. The purge system 30 illustrated and described herein is intended as an example only, and other configurations are also within the scope of the disclosure. Other examples of purge systems contemplated herein are set forth in more detail in U.S. patent application Ser. No. 15/808,837 filed on Nov. 9, 2017, the entire contents of which is incorporated herein by reference.

When the vapor compression loop is operational, the refrigerant may be passively decontaminated. In an embodiment, the pressure from the condenser may create a pressure differential suitable to achieve the required driving force across the separating material 40. As a result, contamination passes through the separating material 40 from a first side to a second side. When the vapor compression loop is non-operational, active decontamination of the separating material 40 is initiated. During active decontamination, the prime mover 42 is used to provide the necessary driving force across the separating material 40 for decontamination.

With reference now to FIGS. 3-6, the controller 50 may be able to actively control operation of the purge system 30, such as operation of the prime mover 42 and/or a position of one or more valves for example, in response to one or more sensed parameters of the purge system 30. The purge system 30 may additionally include one or more sensors arranged in communication with the controller 50. In an embodiment, best shown in FIG. 3, the purge system 30 includes a sensor 60 for monitoring the pressure inside the condenser 14. In such embodiments, the sensor 60 provides a condenser pressure value to the controller 50, allowing the controller 50 to selectively operate the prime mover 42 in response to the condenser pressure value. For example, if the condenser pressure value indicates that the vapor compression loop 10 is non-operational, the controller 50 may initiate operation of the prime mover 42, and if the condenser pressure value indicates that the vapor compression loop 10 is operational, the controller 50 may cease operation of the prime mover 42. Although the sensor 60 is described as being mounted to monitor the pressure inside the condenser 14, it should be understood that the sensor 60 may be mounted at any position suitable to detect the high side pressure of the heat pump, which is the pressure anywhere between the discharge of the compressor 12 and the inlet of the expansion valve 16 of the heat pump 10.

Figure 4:
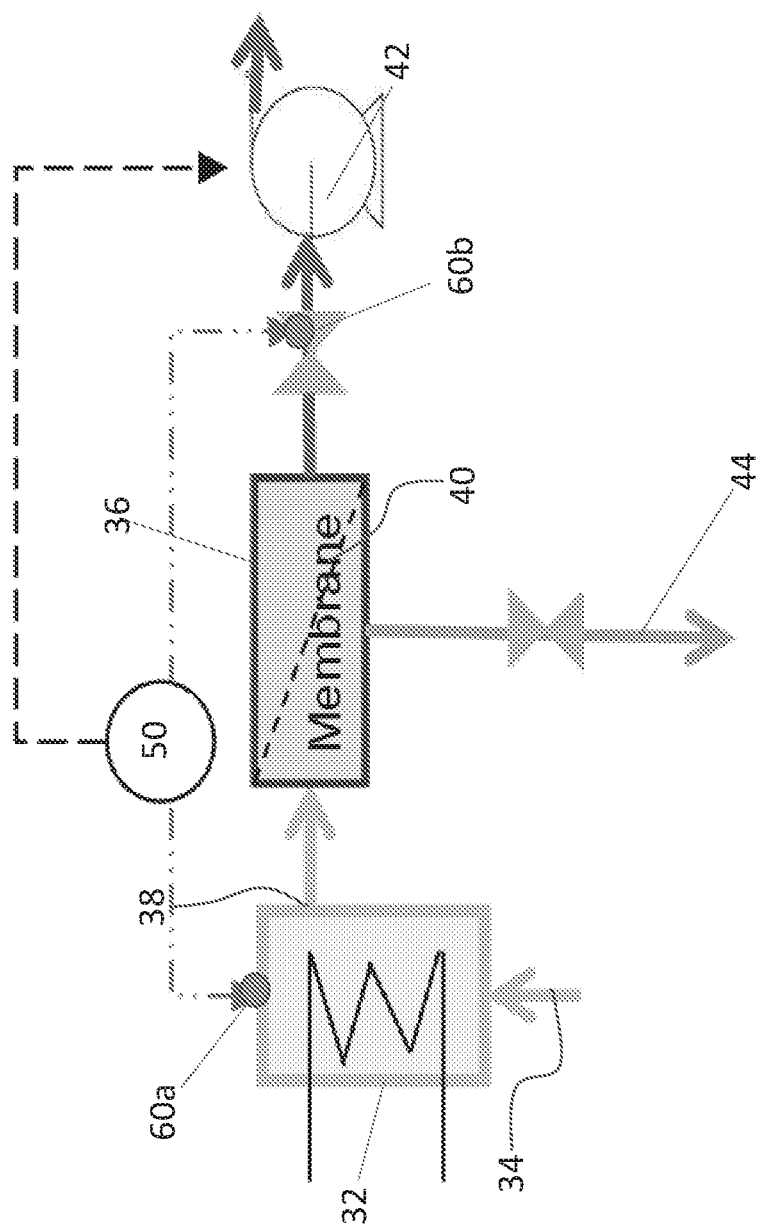
FIG. 4 is a schematic diagram of another purge system according to an embodiment.

In another embodiment, the controller 50 is configured to control one or more parameters of the purge system 30 in response to a pressure across the separator 36 of the purge system 30. With reference to FIG. 4, the purge system 30 may include a first pressure sensor 60a and a second pressure sensor 60b disposed on opposite sides of the separator 36. In the illustrated, non-limiting embodiment, the first pressure sensor 60a is positioned upstream from the separator 36 at the purge collector 32, and the second sensor 60b is arranged downstream from the separator 36, such as adjacent a valve for example. However, it should be understood that a first sensor 60a disposed at any position upstream from the separator 36 and a second sensor 60b located at any position downstream from the separator 36 is contemplated herein.

In an embodiment, the controller uses the signals output from the first and second sensors 60a, 60b to calculate a difference in pressure across the separator 36. Although the sensors 60a, 60b are described as pressure sensors, embodiments where the sensors 60a, 60b are operable to measure a parameter directly related to the pressure of the purge system 30 are also within the scope of the disclosure. The pressure at the second side of the separating material 40 will increase as contamination passes though the separating material 40 of the separator 36. In an embodiment, the pressure at the second side of the separating material 40, measured by the second sensor 60b, has a predefined relationship with the pressure upstream from the separator 36, measured by the first sensor 60a, such as the pressure of the purge collector 32, for example. If the difference in the pressure across the separator 36 is within a predetermined threshold, operation of the prime mover 42 may remain constant. However, if the difference in the pressure across the separator 36 is outside of an allowable range or threshold, the controller 50 may operate a valve, such as valve 46 to discharge contamination from the separator 36 to reestablish a pressure differential across the separating material 40, or may vary an operational parameter of the prime mover 42. Alternatively, or in addition, the controller 50 may adjust one or more parameters of the purge system 30 in response to the rate of change of the difference in pressure across the separator 36.

Figure 5:
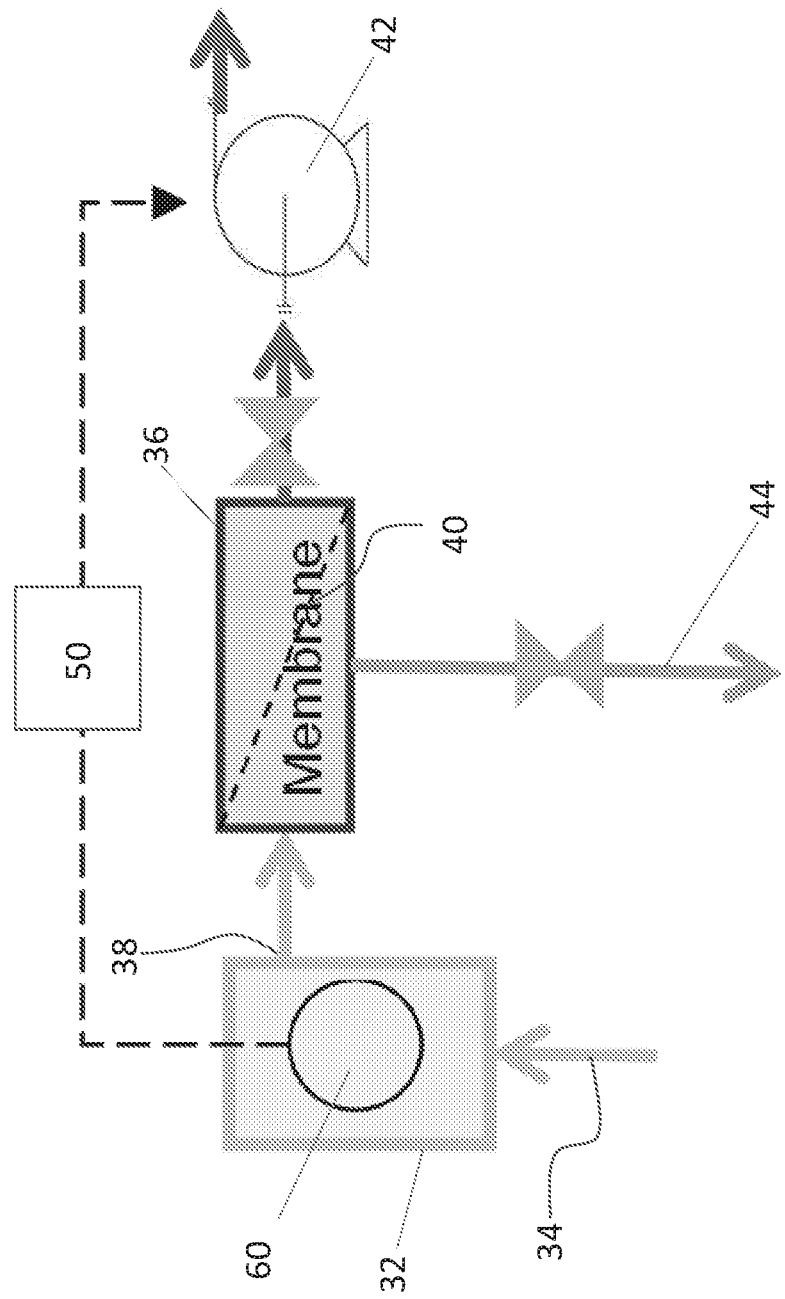
FIG. 5 is a schematic diagram of another purge system according to an embodiment.

In yet another embodiment, best shown in FIG. 5, the controller 50 may be configured to adjust operation of one or more parameters of the purge system 30 in response to the amount of oxygen within the refrigerant. The amount of oxygen present within the purge collector 32 may be representative of the amount of oxygen present within the refrigerant. Accordingly, the purge system 30 may include a sensor associated with the purge collector 32, such as disposed within the interior of the purge collector 32 or arranged at the outlet of the purge collector 32, for example. The sensor 60 is operable to communicate signals to the controller 50 indicative of the amount of oxygen present within the purge collector. Alternatively, the sensor 60 disposed within the purge collector 32 may be operable to detect a density of the mixture of refrigerant and contaminants therein. The density of the refrigerant and contaminant mixture will vary based on the amount of contamination, such as oxygen, nitrogen, water, water vapor, carbon dioxide, or air within the refrigerant, for example. The controller 50 will use the sensed data to determine a level of contamination and will vary operation of the prime mover 42 accordingly to maximize the operational efficiency of the purge system 30. For example, the controller 50 may initiate operation of the prime mover 42 only when oxygen or contamination is detected within the purge collector 32.

Figure 6:
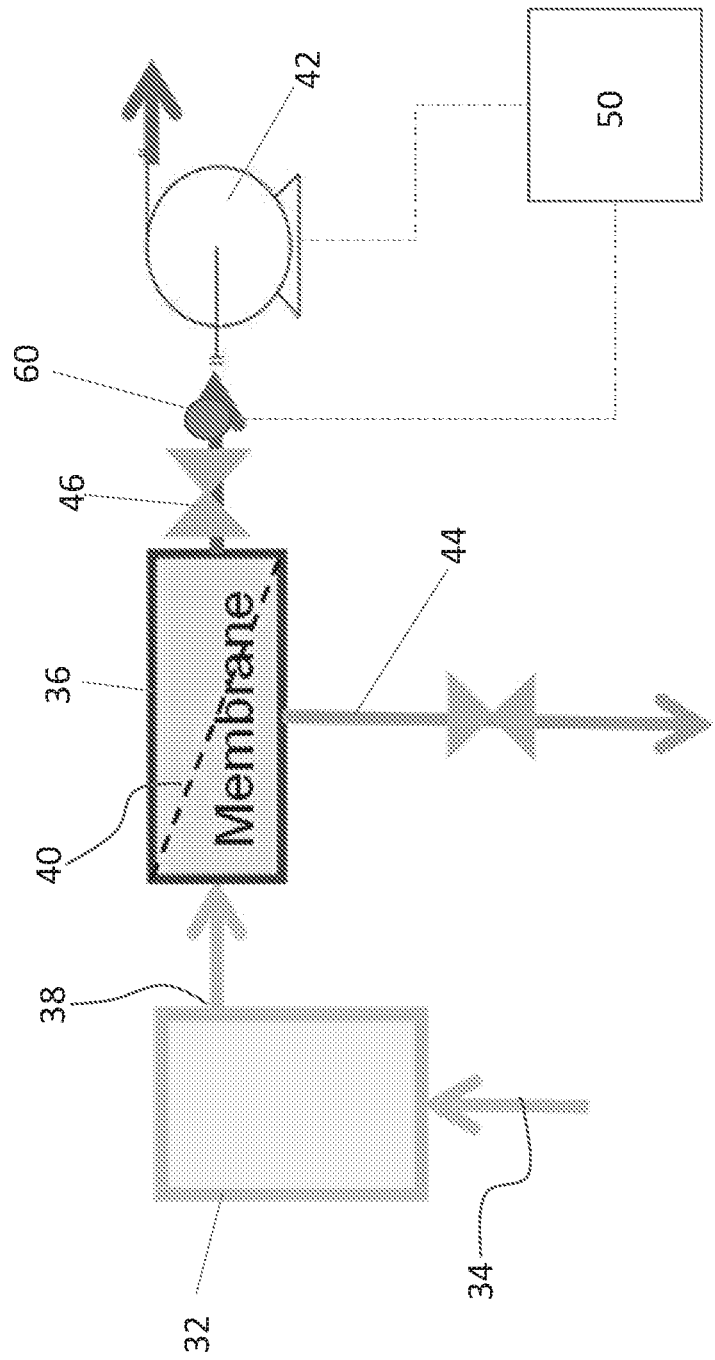
FIG. 6 is a schematic diagram of another purge system according to an embodiment.

With reference now to FIG. 6, in another embodiment, a sensor 60 may be located downstream from the separating material 40 within the conduit recirculating refrigerant to the vapor compression loop. The sensor may be operable to measure a flow of the refrigerant, such as the flow rate of the refrigerant, or alternatively, a density or pressure of the flow of refrigerant for example. With this information, the controller 50 may be operable to determine an amount of contaminant removed from the refrigerant and adjust operation of the purge system 30 accordingly. In an embodiment, the sensor 60 is positioned within the purge system 30 upstream from the separator 36 with respect to the flow of refrigerant. However, embodiments where the sensor 60 is arranged downstream from the separator 36 are also contemplated herein.

By controlling one or more operating parameters of the purge system 30 as illustrated and describe herein, reduced or negligible refrigerant loss may be achieved. In addition, the operating and maintenance costs may be reduced while improving not only the reliability, but the operational efficiency of the purge system 30. Accordingly, such control of the purge system 30 may increases the life of the prime mover 42.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of purging contaminants from a refrigerant of a heat pump via a purge system comprising:
   generating a driving force across a separator;
   providing refrigerant including contaminants to the separator;

separating the contaminants from the refrigerant within the separator;

monitoring one or more parameters of the purge system and the heat pump; and actively controlling an operational parameter of the purge system in response to monitoring one or more parameters of the purge system and the heat pump;

wherein monitoring one or more parameters of the purge system and the heat pump includes at least one monitoring a rate of change of difference in pressure across the separator, monitoring an amount of contaminants within the refrigerant, and monitoring a difference in pressure across the separator wherein if the difference in pressure across the separator is below a threshold, actively controlling an operational parameter of the purge system in response to monitoring the difference in pressure across the separator includes maintaining constant operation of the purge system.

2. The method of claim 1, wherein monitoring of one or more parameters of the purge system and the heat pump includes monitoring a high side pressure of the heat pump.

3. The method of claim 2, wherein actively controlling an operational parameter of the purge system in response to the high side pressure of the heat pump includes controlling operation of a prime mover coupled to the separator.

4. The method of claim 1, wherein if the difference in pressure across the separator is above a threshold, actively controlling an operational parameter of the purge system in response to monitoring the difference in pressure across the separator includes adjusting operation of a prime mover of the purge system or operation of a valve in the purge system.

5. The method of claim 1, wherein if the rate of change of difference in pressure across the separator is below a threshold, actively controlling an operational parameter of the purge system in response to monitoring the rate of change of difference in pressure across the separator includes maintaining constant operation of the purge system.

6. The method of claim 1, wherein if the rate of change of difference in pressure across the separator is above a threshold, actively controlling an operational parameter of the purge system in response to monitoring the rate of change of difference in pressure across the separator includes adjusting operation of a prime mover of the purge system or operation of a valve in the purge system.

7. The method of claim 1, wherein monitoring an amount of contaminants within the refrigerant includes monitoring an amount of oxygen within the refrigerant.

8. The method of claim 1, wherein monitoring an amount of contaminants within the refrigerant includes monitoring a density of the mixture of refrigerant and contaminants.

9. The method of claim 1, wherein monitoring one or more parameters of the purge system and the vapor compression loop includes measuring a flow of refrigerant or contaminant or a mixture thereof through the purge system.

10. The method of claim 1, wherein the purge system further comprises a controller and a prime mover, and actively controlling an operational parameter of the purge system includes controlling operation of the prime mover via the controller.

11. The method of claim 1, wherein the purge system further comprises a controller and at least one valve, and actively controlling an operational parameter of the purge system includes controlling a position of the at least one valve via the controller.

12. The method of claim 1, wherein the heat pump further comprises a condenser and monitoring one or more parameters of the purge system and the vapor compression loop includes measuring a temperature at an outlet of the condenser.

13. The method of claim 12, wherein if the temperature at an outlet of the condenser is below a threshold, actively controlling an operational parameter of the purge system in response to monitoring the difference in pressure across the separator includes maintaining constant operation of the purge system.

14. The method of claim 10, wherein if the temperature at an outlet of the condenser is above a threshold, actively controlling an operational parameter of the purge system in response to monitoring the difference in pressure across the separator includes adjusting operation of a prime mover of the purge system or operation of a valve in the purge system.

15. A heat pump comprising:
a vapor compression loop;
a purge system in communication with the vapor compression loop, the purge system including a separator operable to separate contaminants from a refrigerant purge gas provided from the vapor compression loop;
a sensor for monitoring one or more parameters of the purge system and the vapor compression loop; and
a controller connected to the sensor, the controller being operable to actively control at least one operational parameter of the purge system in response to data provided by the sensor;
wherein the sensor is operable to monitor at least one a rate of change of difference in pressure across the separator, an amount of contaminants within the refrigerant, a difference in pressure across the separator;
wherein if the difference in pressure across the separator is below a threshold, an operational parameter is controlled to maintain a constant operation of the purge system.

* * * * *